UNITED STATES PATENT OFFICE.

JOSEPH KOETSCHET, OF ST. FONS, FRANCE, ASSIGNOR TO SOCIÉTÉ CHIMIQUE DES USINES DU RHÔNE, ANCIENNEMENT GILLIARD, P. MONNET ET CARTIER, OF LYONS, FRANCE, A CORPORATION.

SUBSTITUTED SULFINID AND PROCESS OF MAKING SAME.

SPECIFICATION forming part of Letters Patent No. 692,863, dated February 11, 1902.

Application filed July 2, 1901. Serial No. 66,906. (No specimens.)

*To all whom it may concern:*

Be it known that I, JOSEPH KOETSCHET, chemist at the works of Société Chimique des Usines du Rhône, anciennement Gilliard, P. Monnet et Cartier, of St. Fons, near Lyons, France, have invented certain new and useful Improvements in the Manufacture of Substituted Sulfinids, of which the following is a specification.

This invention relates to the manufacture of substituted sulfinids, and especially to the manufacture of para-amido-benzoic sulfinid, which is a sweet substance free from bitter taste.

Para-amido-benzoic sulfinid was prepared by Noyes (*American Chemical Journal*, Vol. VIII, page 172) by an indirect process from para-nitro-ortho-toluene sulfamid. By the oxidation of para-nitro-ortho toluene sulfamid with potassium permanganate Noyes obtained a small yield of an intensely-bitter substance—namely, para-nitro-benzoic sulfinid—which by the action of reducing agents was converted into the corresponding para-amido-benzoic sulfinid having a sweetish taste.

I have discovered that by treatment with alkaline sulfids, for example, with a solution of sulfur in caustic soda and water para-amido-benzoic sulfinid may be produced from para-nitro-ortho-toluene sulfamid direct—that is to say, in one operation. By this direct method the expensive oxidation with permanganate is also avoided.

For example, according to my invention, ten kilograms of para-nitro-ortho-toluene sulfamid may be conveniently dissolved in one hundred and fifty liters of a solution consisting of six parts sulfur, twelve parts caustic soda, and seventy-five parts water. After boiling some hours the solution is acidified and the precipitate, which contains also sulfur, is extracted with ether. The ethereal residue may be purified by resolution in ammonia and precipitation therefrom with hydrochloric acid.

The above example is merely given as an illustration of the manner in which the invention may be carried out; but the process may be varied considerably in detail without altering the nature of the invention. The process is also applicable to the preparation of other substituted sulfinids.

What I claim, and desire to secure by Letters Patent, is—

1. In the manufacture of a substituted sulfinid, heating a substituted sulfamid with an alkaline sulfid.

2. In the manufacture of a substituted sulfinid, heating a substituted toluene sulfamid with an alkaline sulfid.

3. In the manufacture of para-amido-benzoic sulfinid heating para-nitro-ortho-toluene sulfamid with an alkaline sulfid.

4. The process of preparing para-amido-benzoic sulfinid which consists in boiling para-nitro-ortho-toluene sulfamid in a solution of sulfur in caustic alkali, acidifying, and extracting the resulting precipitate, substantially as described.

In witness whereof I have hereunto signed my name in the presence of two subscribing witnesses.

JOSEPH KOETSCHET.

Witnesses:
MARIN VACHOW,
F. REICHMANN.